(12) United States Patent
Ortega et al.

(10) Patent No.: US 12,405,195 B2
(45) Date of Patent: Sep. 2, 2025

(54) MECHANICAL MOVEMENT AND PRESSURE FOR A THERMAL CONDUCTIVITY METER

(71) Applicant: Thermtest Inc., Hanwell (CA)

(72) Inventors: Genaro Ortega, Fredericton (CA);
Keegan Copage, Fredericton (CA);
Michael Barnhill, Fredericton (CA)

(73) Assignee: Thermtest Inc., Hanwell (CA)

( * ) Notice: Subject to any disclaimer, the term of this patent is extended or adjusted under 35 U.S.C. 154(b) by 438 days.

(21) Appl. No.: 17/662,997

(22) Filed: May 11, 2022

(65) Prior Publication Data

US 2022/0365013 A1   Nov. 17, 2022

Related U.S. Application Data

(60) Provisional application No. 63/187,727, filed on May 12, 2021.

(51) Int. Cl.
| | |
|---|---|
| G01N 25/18 | (2006.01) |
| G01K 17/08 | (2006.01) |
| G01N 3/08 | (2006.01) |
| G01N 25/00 | (2006.01) |

(52) U.S. Cl.
CPC ..................... G01N 3/08 (2013.01)

(58) Field of Classification Search
None
See application file for complete search history.

(56) References Cited

U.S. PATENT DOCUMENTS

| | | | | |
|---|---|---|---|---|
| 3,521,476 | A  * | 7/1970 | Day ...................... | G01N 25/18 374/44 |
| 3,733,887 | A  * | 5/1973 | Stanley .................. | G01N 25/18 374/44 |
| 6,142,662 | A  * | 11/2000 | Narh ...................... | G01N 25/18 374/30 |
| 6,742,926 | B1 * | 6/2004 | Fesmire ................. | G01N 25/18 374/45 |
| 6,896,405 | B2 * | 5/2005 | Osone .................... | G01N 25/18 374/46 |
| 10,753,896 | B1 * | 8/2020 | Gaal ...................... | G01N 25/18 |
| 2013/0021049 | A1 * | 1/2013 | Barabi .................. | G01R 1/0458 324/750.08 |

OTHER PUBLICATIONS

ASTM, "Designation: E1530-19: Standard Test Method for Evaluating the Resistance to Thermal Transmission by the Guarded Heat Flow Meter Technique", ASTM International, 2019, pp. 1-4 (Year: 2019).*

* cited by examiner

Primary Examiner — Daniel S Larkin
(74) Attorney, Agent, or Firm — Shumaker & Sieffert, P.A.

(57) ABSTRACT

Apparatuses and methods for using the guarded heat flow meter technique are provided. The apparatuses use the guarded heat flow meter method to measure the thermal conductivity of solid materials in the temperature range of about ambient to 300° C. The material being tested is compressed between two plates with a controlled temperature difference. The thermal conductivity of the material is calculated by measuring the heat flux through a reference sample in series with the material under test. The apparatuses and methods comprise mechanical mechanisms for stack and guard movements and methods of stack compression and measurement for the testing.

16 Claims, 8 Drawing Sheets

MECHANICAL MOVEMENT AND PRESSURE FOR A THERMAL CONDUCTIVITY METER

CROSS-REFERENCE TO RELATED APPLICATIONS

This application claims priority to U.S. Provisional Patent Application No. 63/187,727, filed on May 12, 2021, the entire contents of which is incorporated herein by reference for all purposes.

TECHNICAL FIELD

The present disclosure relates to apparatuses and methods for using the guarded heat flow meter technique, and in particular to apparatuses and methods to measure the thermal conductivity of a material.

BACKGROUND

Figure 1:
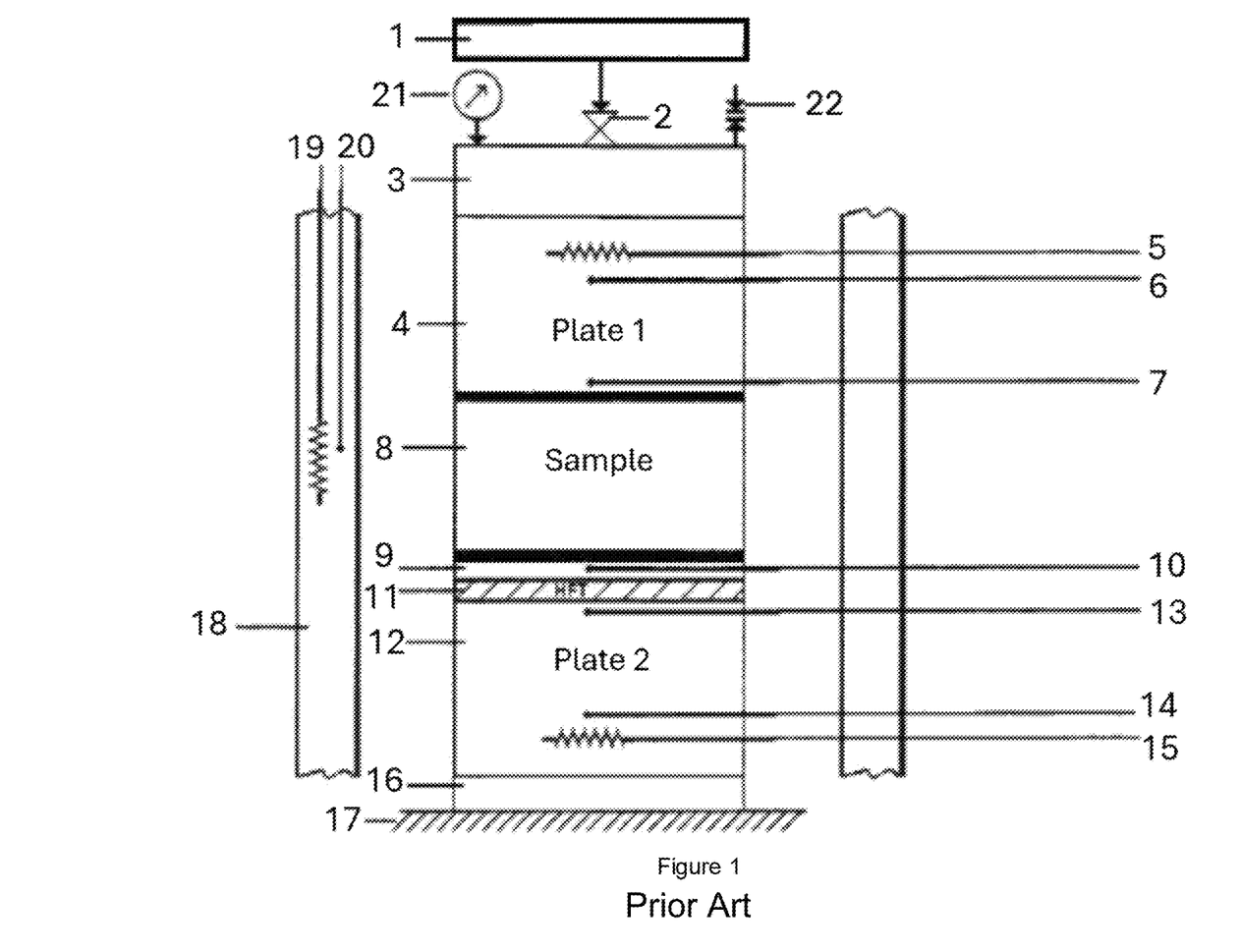
FIG. 1 depicts a sectional view of a Guarded Heat Flow Meter as shown in ASTM E1530-19.

To measure and compare thermal properties of materials under controlled conditions, the guarded heat flow meter technique may be used. A device for using the guarded heat flow meter technique is shown in FIG. 1 described in ASTM E1530-19. A sample material to be tested is placed between two plates controlled at different temperatures. A reproducible force is applied to the stack to provide good contact between the plates and the sample material. A guard may be positioned around the stack which is maintained at a uniform temperature during the testing.

To minimize lateral heatflow to and from the stack, the guard is positioned to surround the stack. The guard may be positioned by manually adjusting set pins or other locking mechanisms to hold the guard in place. The guard may then be repositioned manually to a position where it is not surrounding the stack. The force on the stack and the linear motion may be applied by, for example, a pneumatic cylinder set by a dial. The dial may adjust the pneumatic pressure. Although the pneumatic cylinder can provide the force to the stack, the pneumatic cylinder's adjustments to provide the force may be very coarse and can damage the sample material.

Accordingly, an additional, alternative, and/or improved device and method for using the guarded heat flow meter technique is desired.

SUMMARY OF THE INVENTION

In accordance with one aspect of the disclosure, an apparatus for measuring thermal conductivity of a material is disclosed, the apparatus comprising: a stack comprising a first plate in contact with a top surface of the material and a second plate in contact with a bottom surface of the material; a gimbal joint coupled to the first plate at one end and coupled to a linear actuator at an opposite end; and a spring surrounding the gimbal joint, wherein the linear actuator is configured to cause compression of the spring, and compression of the spring transmits a force to compress the stack.

In some aspects, the gimbal joint comprises a flexible rod indirectly coupled to the linear actuator at one end and coupled to a moveable rod at an opposite end, the movable rod configured to move vertically within an opening to facilitate compression of the spring.

In some aspects, the movable rod comprises a retaining flange at a lower end thereof that is wider than the opening, and the retaining flange retains the movable rod in place when the spring is in an uncompressed state.

In some aspects, the linear actuator drives a lead screw to create a force that compresses the spring.

In some aspects, the apparatus further comprises at least two vertical guide rods extending through a plate, the at least two vertical guide rods extending parallel to the lead screw to maintain alignment of the lead screw.

In some aspects, the apparatus further comprises an encoder and encoder strip, the encoder strip held by a linear rail coupled to the stack, the encoder mounted to a ball joint coupled to the linear actuator.

In some aspects, the linear rail is mounted to a ball joint at its base.

In some aspects, the encoder reads the encoder strip to determine a height of the stack.

In some aspects, the apparatus further comprises a guard positionable to surround the first and second plates.

In some aspects, the guard is positionable in a vertical direction via a lead screw and stepper motor.

In some aspects, the apparatus further comprises at least two guide rods for horizontal alignment of the guard.

In some aspects, the guard is positioned automatically based on a thickness of the material.

In some aspects, the apparatus further comprises a load cell configured to measure an upward force received from the stack.

In some aspects, an output from the load cell is provided to a processor, and the processor controls the linear actuator to apply a set force to the stack.

In accordance with another aspect of the present disclosure, a method of compressing a stack for measuring thermal conductivity of a material is disclosed, the stack comprising a first plate in contact with a top surface of the material and a second plate in contact with a bottom surface of the material, the method comprising: receiving a set force of compression to be applied to the stack; compressing the stack by compressing a spring surrounding a gimbal joint, the gimbal joint coupled to the first plate at one end and coupled to a linear actuator at an opposite end, the linear actuator configured to cause compression of the spring; measuring, with a load cell, an upward force received from the stack; and adjusting the linear actuator to adjust compression of the spring until the upward force received from the stack corresponds to the set force.

In accordance with another aspect of the present disclosure, a method of compressing a stack for measuring thermal conductivity of a material is disclosed, the stack comprising a first plate in contact with a top surface of the material and a second plate in contact with a bottom surface of the material, the method comprising: receiving a set material thickness; compressing the stack by compressing a spring surrounding a gimbal joint, the gimbal joint coupled to the first plate at one end and coupled to a linear actuator at an opposite end, the linear actuator configured to cause compression of the spring; measuring a distance between the top and bottom plates of the stack; and adjusting the linear actuator to adjust the stack until the distance between the top and bottom plates of the stack corresponds to the set material thickness.

BRIEF DESCRIPTION OF DRAWINGS

Features and advantages of the present disclosure will become apparent from the following detailed description, taken in combination with the appended drawings, in which.

DETAILED DESCRIPTION

Apparatuses and methods for using the guarded heat flow meter technique are disclosed herein. The apparatuses and methods use the guarded heat flow meter technique to measure the thermal conductivity of solid materials in a temperature range of about ambient temperature to 300° C. The material being tested is compressed between two plates with a controlled temperature difference. One of the plates is temperature controlled to be a set temperature, and the other plate being controlled at a set temperature below the temperature of the first plate with a known difference. Each plate may be in contact with a heater, and possibly a heat sink. It will be appreciated that in the present invention, the heaters and heat sinks may be separated by a mica heat break. The thermal conductivity may be calculated by measuring the heat flux through a reference sample in series with the material being tested. The apparatuses and methods comprise mechanical mechanisms for stack and guard movements and methods of stack compression and measurement for the testing.

FIG. 1 depicts a sectional view of an embodiment of a Guarded Heat Flow Meter (GHFM) as shown in ASTM E1530-19. As described in ASTM E1530-19, the GHFM comprises a pneumatic or hydraulic cylinder 1 to provide compressive force to the stack, and a gimbal joint 2. It will be appreciated that a dial or other adjustment means may be used to set the compression pressure to 40 PSI. The gimbal joint 2 provides up to 5 degrees of swivel. The GHFM further comprises a top plate 4 and a lower plate 12 which the specimen/sample 8 is placed between. The top plate 4 may be separated from the gimbal joint 2 by an insulator plate 3.

The top plate 4 may act as a hot plate having a heater 5, a control thermocouple 6, and a temperature sensor 7. The temperature sensor 7 may be in close proximity to or be on a face of the specimen 8, to obtain the temperature of the surface of the specimen 8. The lower plate 12 is similar to the top plate 4, however the lower plate 12 may be in close proximity to a heat sink 17, with an insulator plate 16 between the lower plate 12 and the heat sink 17. The lower plate 12 may comprise a temperature sensor 13, a control thermocouple 14, and a heater or cooling coils 15. The specimen 8 and the lower plate 12 may be separated by an intermediate plate 9 and a heat flux transducer (HFT) 11. A temperature sensor 10 may be present in the intermediate plate 9 or the HFT 11 to obtain an average temperature of the surface of the specimen 8. It will appreciated that the intermediate plate 9 is an optional element of the GHFM.

During testing, the stack is surrounded by a guard 18. The guard 18 may be equipped with a heater and/or cooling coils 19, and control thermocouple, resistance thermometer, or thermistor 20 to maintain a mean temperature between the top plate 4 and the lower plate 12. The GHFM further comprises a means 21 to measure the thickness of the specimen 8, and a means 22 to limit compression of the specimen 8, in particular when testing elastomeric or other compressible materials.

In accordance with the present invention, an apparatus for using the guarded heat flow meter technique to measure the thermal conductivity of solid materials is provided. The apparatus comprises a stack adjustment means or assembly, a stack gimbal assembly, a compression force means, and an encoder movement assembly. The apparatus may further comprise a guard adjustment means or system. The elements of the apparatus allow for the thermal conductivity of the material being tested to be measured accurately and efficiently.

Figure 2:
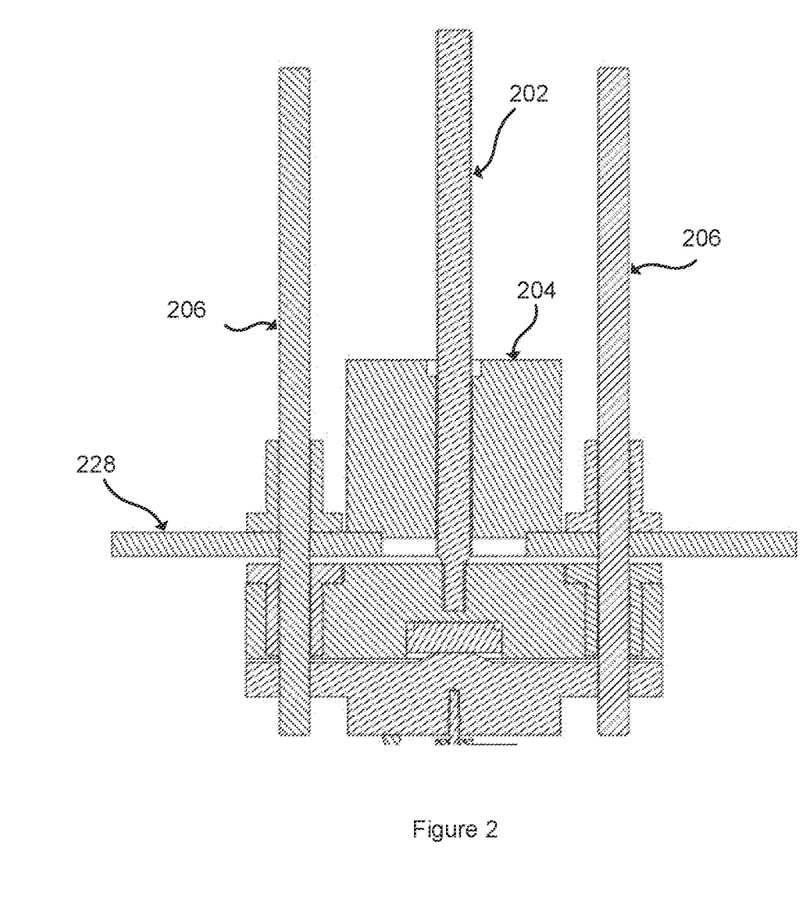
FIG. 2 depicts a sectional view of an embodiment of a stack adjustment assembly of an apparatus in accordance with aspects of the present disclosure.

FIG. 2 depicts a sectional view of an embodiment of the stack adjustment assembly or means of the apparatus for linear motion and applying force. The stack adjustment means comprises a lead screw 202 which is driven by a linear actuator or stepper motor 204. The linear actuator 204 may rotate a nut inside the motor which can drive the lead screw 202 vertically upwards and downwards. It will be appreciated that the lead screw 202 may be a non-rotating screw.

The actuator 204 can be activated to move the stack into position. The stack adjustment means allows for the position of the stack to be adjusted in the vertical direction to provide the compression force to a sample material between the two plates. The stack adjustment means can be used to apply the force to a top surface of the sample material via the top plate. The stack adjustment means may be an automatic system where a user sets or controls the position of the stack via a computer system. Once activated, the stack may be moved into place automatically.

The stack adjustment means may further comprise guide rods 206 extending through a plate 228 which may act as linear support guides. There may be two vertical guide rods 206 which hold the stack adjustment means in horizontal alignment. The vertical guide rods 206 extend parallel to the lead screw 202 to maintain alignment of the lead screw. The vertical guide rods 206 prevent rotation of the stack adjustment means during adjustment and ensure a smooth linear motion when the stack is being moved into position.

Figure 3:
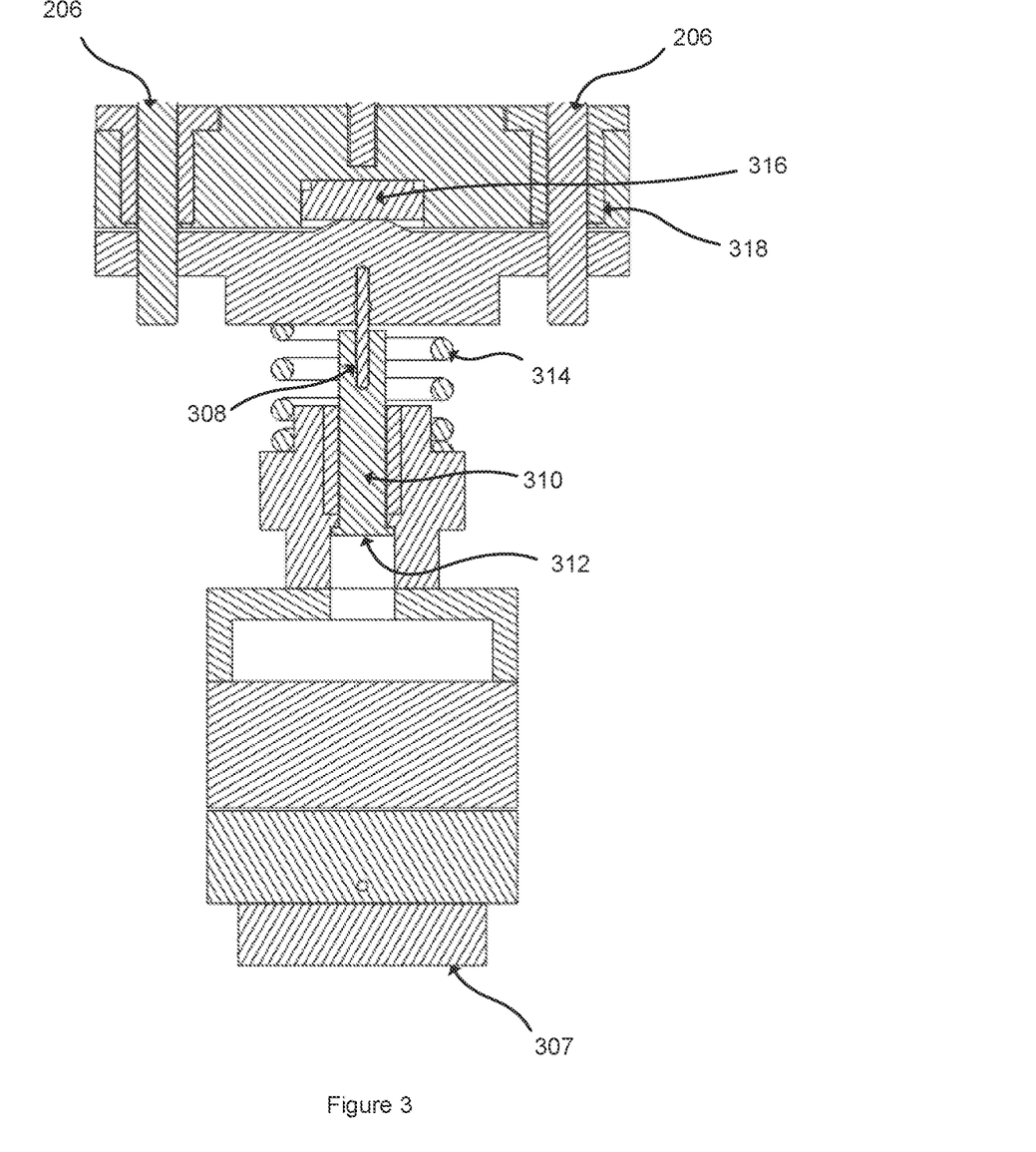
FIG. 3 depicts a sectional view of an embodiment of a stack gimbal assembly of the apparatus.

FIG. 3 depicts a sectional view of an embodiment of a stack gimbal assembly of the apparatus. The stack gimbal assembly allows the top plate 307 to have five angular degrees of swivel perpendicular to the compression force which is transmitted via the axis of the stack, as stated in ASTM E1530-19. The stack gimbal assembly comprises a secured rod 308 which may be of spring steel. The secured rod 308 acts as a flexing point or gimbal joint for the top stack, allowing the five degrees of swivel. The secured rod 308 may be indirectly coupled to the actuator 204 at one end, and directly coupled to a movable rod 310 at the opposite end. The rod 310 is configured to move vertically within an opening. The rod 310 may have a retaining flange or shoulder 312 at a bottom side/lower end of the rod 310 which is wider than the opening, and retains the rod 310 in place to allow the stack to be held together when the system is not clamping or is in an uncompressed state not under compression.

As depicted in FIG. 3, the secured rod 308 or the gimbal joint is surrounded by a spring 314. The spring 314 may be a compression spring that is compressed when the lead screw 202 is driven by the linear actuator 204, and the compression force of the spring 314 is applied to the stack. During the compression, the rod 310 may slide freely in the vertical direction allowing the secured rod 308 to not be compressed during the compression of the stack. The stack gimbal assembly allows for the secured rod 308 or gimbal joint to be subjected to small tensile loads rather than large compressive loads that may be present during the compression or clamping. This reduces the risk of permanent deformation of the secured rod 308 or the gimbal joint.

The apparatus may further comprise a load cell or force gauge 316 to digitally measure the compression force being applied. In the stack gimbal assembly shown in FIG. 3, the load cell 316 measures the upward force from the stack/spring 314. The force measured by the load cell 316 may thus be used in a feedback loop of the stack movement. This allows for a set compression force, e.g. 40 PSI of pressure, to be precisely applied. The apparatus may be controlled via a computer system as described above and the apparatus may comprise a microcontroller having a processor configured to control the mechanical assemblies. The feedback of the load cell 316 may be processed by the microcontroller which is used as compensation in the control system. With the use of a feedback loop, very precise control of the system may be achieved. As depicted in FIG. 3, the apparatus may further comprise bearings 318 for the guide rods 206 to ensure that all of the applied force is transmitted through the force gauge 316.

Figure 4:
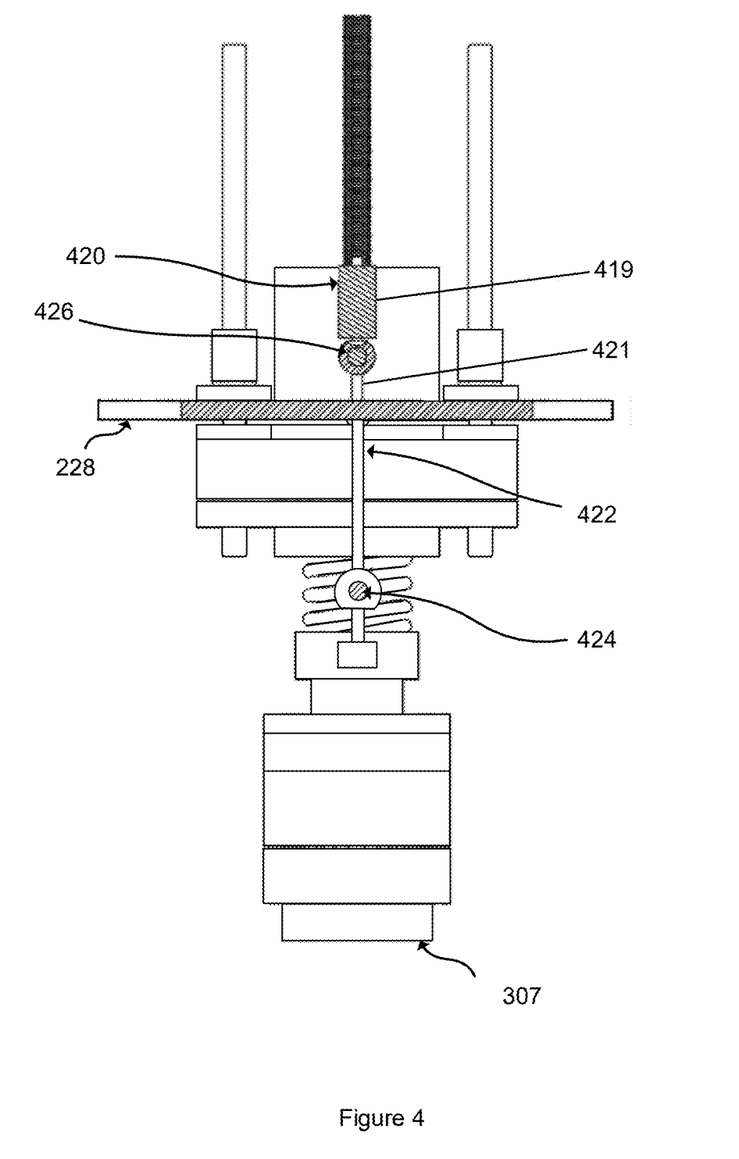
FIG. 4 depicts a sectional view of an embodiment of an encoder movement assembly of the apparatus.

FIG. 4 depicts a sectional view of an embodiment of an encoder movement assembly of the apparatus. The encoder movement assembly may be used to limit the compression on the sample material based on the thickness of the sample material. The encoder movement assembly can measure or read the height of the stack with the sample material between the top plate 307 and a bottom plate, before and during compression of the stack. This allows the sample material thickness to be measured.

The encoder movement assembly comprises an encoder 419 and linear carriage mount 420, and an encoder strip 421 coupled to or held in place by a linear rail 422 coupled to the stack. The assembly further comprises a ball joint 424 at the base of the linear rail 422 with the encoder strip 421, and a second ball joint 426 mounting the encoder 419. The ball joint 426 is connected to plate 228 (shown in FIGS. 2 and 4) which is coupled to the linear actuator 204. The ball joints 424, 426 allow for some degree of flexibility of the encoder 419 and the encoder strip 421 as the encoder strip 421 is mechanically attached to the stack which has five angular degrees of swivel.

The encoder movement assembly allows for the movement of the gimbal joint and maintains accurate distance measurements from the encoder 419. The in-plane position of the encoder 419 to the encoder 421 strip helps to maintain accuracy of the measurements. As the linear actuator 204 drives the lead screw 202 to compress the stack, the encoder strip 421 is moved with the top of the stack. The encoder strip 421 may move with the stack below the spring 314 before and during the compression. It will be appreciated that when the spring 314 begins to compress, the stack may no longer be moving. The encoder 419 may be still even though the lead screw 202 continues to move and compress the spring 314. Therefore, the sample material is measured rather than the sample material and the compression of the spring 314. The encoder 419 can then read the encoder strip 421 to determine the compressed height of the stack.

The ball joints 424, 426 further ensure that the linear motion of the encoder strip 421 is not impeded during motion. If the top plate 307 swivels in the direction of the angular degrees of swivel, the encoder strip 421 attached to the linear rail 422 is able to swivel on the ball joint 424 so that the encoder strip 421 passes though the encoder 419. The encoder 419 is able to swivel on the ball joint 426 to maintain a position parallel to the encoder strip 421. The linear carriage 420 is mated to the linear rail 422 and is secured to the same mount that holds the encoder 419 to the ball joint 426. This ensures that the ball joint 426 swivels to maintain the alignment or in-plane distance between the encoder 419 and encoder strip 421.

It will be appreciated that the linear encoder strip 421 held in place by the linear rail 422 and the encoder 419 may be used to measure the precise height of the stack. The linear encoder strip 421 is read by the encoder 419. It will be appreciated that the encoder 419 may be an optical encoder that reads the linear encoder strip 421 onto the microcontroller unit (MCU) of the apparatus. It will also be appreciated that other arrangements of displacement transducers can be used in place of the specific encoder 419/encoder strip 421 arrangement described with reference to FIG. 4. The microcontroller may receive information regarding the height of the stack, and can determine a material thickness of the sample based on a distance between top/bottom plates of the stack. Based on the material thickness of the sample material, the microcontroller can control the linear actuator in order to apply a set compression amount of the sample material or achieve a set material thickness.

Figure 5:
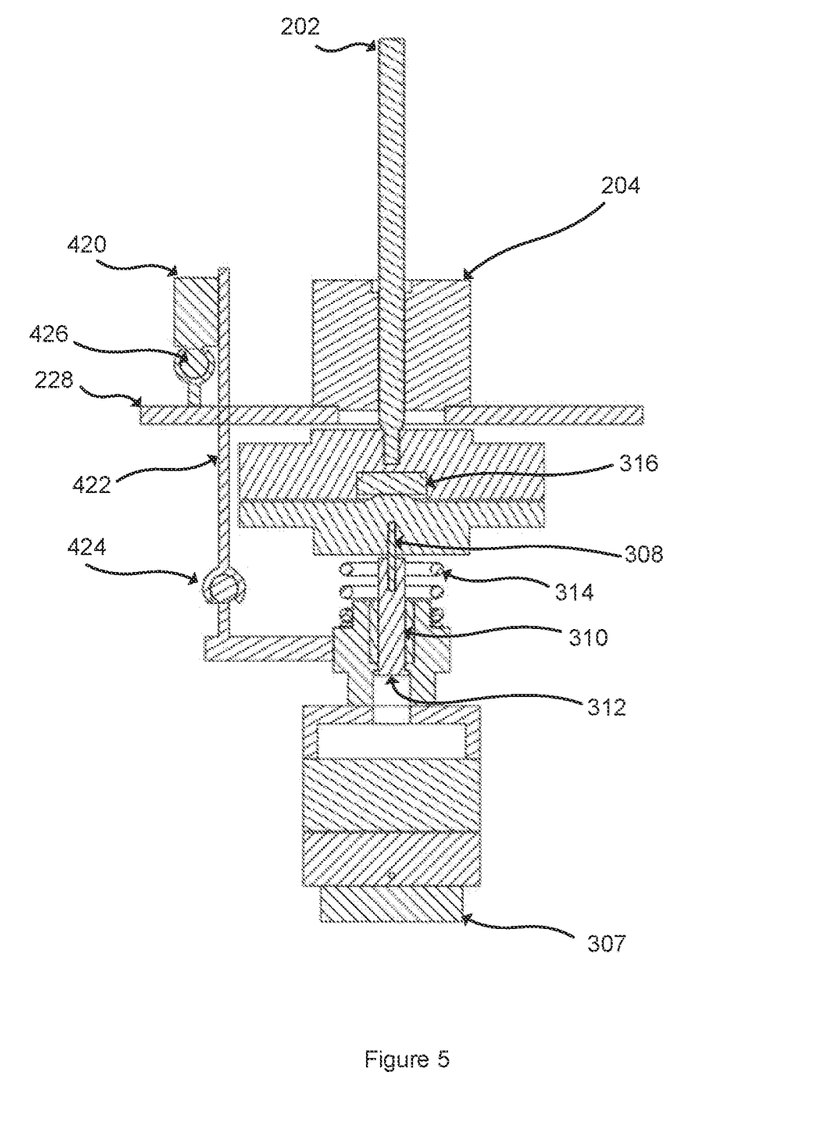
FIG. 5 depicts a sectional view showing the configuration of components of the stack adjustment assembly, the stack gimbal assembly, and the encoder movement assembly of the apparatus.

FIG. 5 depicts a sectional view showing the configuration of components of the stack adjustment assembly, the stack gimbal assembly, and the encoder movement assembly assembled in the apparatus. As described above, the compression force for the material to be tested is applied using the lead screw 202 driven by the stepper motor 204, in conjunction with the spring 314 as further described and depicted in FIG. 3. This allows for the compression force to be applied in a controlled and precise manner.

To limit the compression when testing the material, the apparatus can read the stack height or position from the encoder strip 421. The stack height or position can then be used to precisely place the top stack or top plate 307 above the bottom stack using the linear actuator 204. The precise placement of the top stack is at a height above the bottom stack equal to the limiting thickness of the sample.

Figure 6:
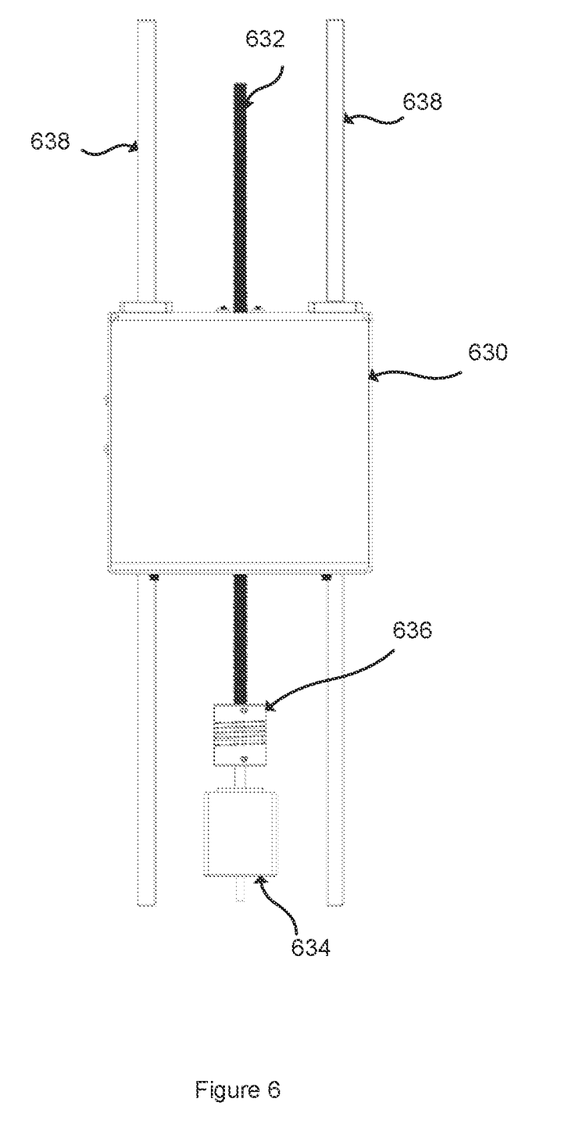
FIG. 6 depicts an embodiment of a guard adjustment system of the apparatus.

FIG. 6 depicts an embodiment of a guard adjustment system of the apparatus. The guard adjustment system comprises a guard 630 which is positioned to surround the stack during testing of the material. The guard 630 may be placed around the stack to prevent and minimize any radial heat losses/gains during the testing. To position the guard 630 around the stack, the vertical position of the guard 630 may be adjusted using a lead screw 632 driven by a stepper motor 634 and a coupler 636. The lead screw 632 may pass through the center of the guard 630. The guard 630 may comprise a nut, fixed to the guard, to which the lead screw 632 acts on. The lead screw 632 is rotated by the stepper motor 634 to drive the nut vertically upwards and downwards. The horizontal alignment of the guard 630 may be further held by guide rods 638 through linear bearings on the guard 630 to facilitate the movement of the guard 630.

The guard adjustment system may be an automatic system where the guard is positioned around the stack upon activation of the stepper motor 634. The stepper motor 634 may be activated by a user setting or controlling the position of the guard 630 via a computer system. By precisely measuring the height of the sample material in the stack, the guard adjustment system can precisely position the guard 630 at the appropriate height with regard to the measured height of the sample material.

The above described apparatus and systems allow for the thermal conductivity of a material to be measured accurately and efficiently using a GHFM technique. The apparatus and systems described herein follow the ASTM E1530-19 standard referred above.

Figure 7:
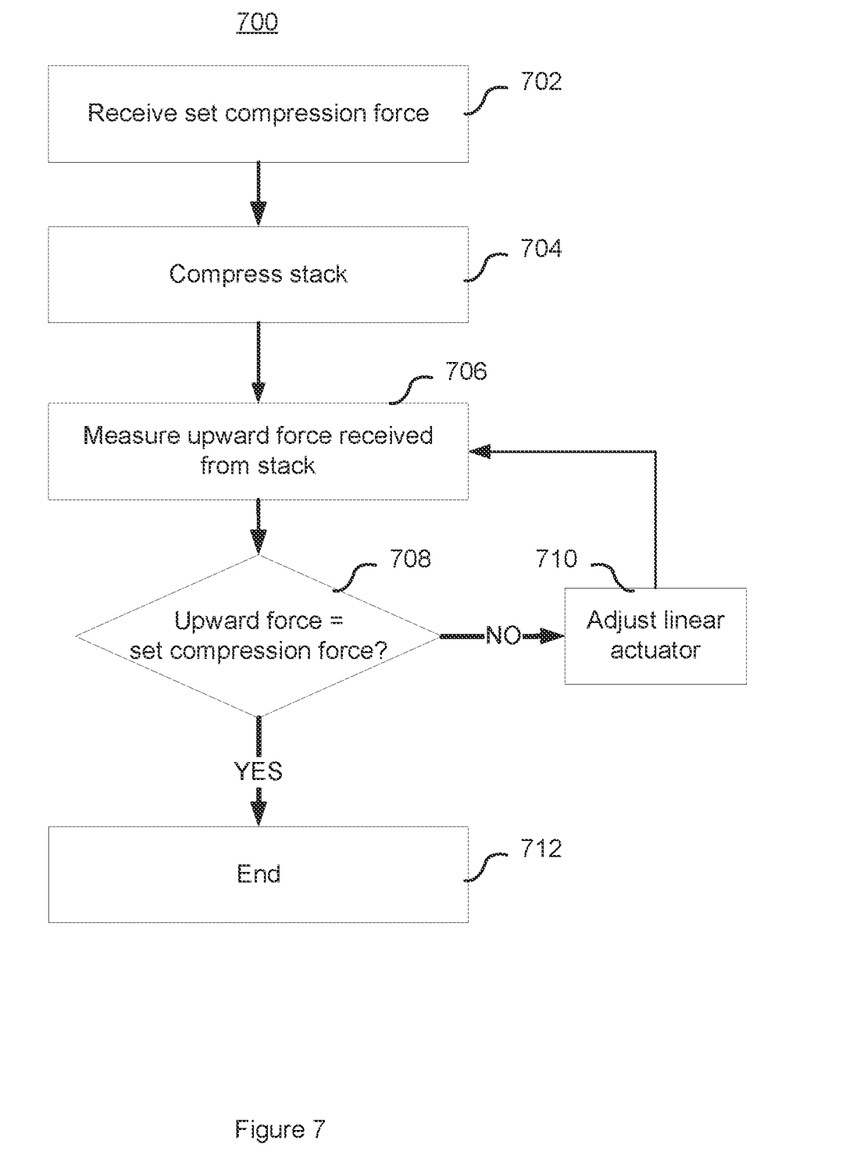
FIG. 7 depicts an embodiment of a method of compressing a stack for measuring thermal conductivity of a material.

FIG. 7 depicts an embodiment of a method 700 of compressing a stack for measuring thermal conductivity of a material. The method 700 may be executed by a processor configured to control the mechanical assemblies of an apparatus as described above. The stack comprises a first plate in contact with a top surface of the material and a second plate in contact with a bottom surface of the material.

The method comprises receiving a set force of compression to be applied to the stack (702). The set force of compression may be received from a user input.

The stack is compressed (704) by compressing a spring that transmits a force to compress the stack. The spring may surround a gimbal joint that is coupled to the first plate of the stack at one end and coupled to a linear actuator at an opposite end. The linear actuator is configured to cause compression of the spring, for example, by actuating a lead screw.

An upward force received from the stack is measured (706). The upward force may be measured using a load cell that measures the upward force from the spring.

A determination is made as to whether the measured upward force is equal to the set compression force (708). If the measured upward force is not equal to the set compression force (NO at 708), the linear actuator is adjusted (710) to adjust compression of the spring toward achieving the set compression force. The upward force received from the stack is measured again (706) and a further determination is made as to whether the measured upward force is equal to the set compression force (708). The method continues until the measured upward force received from the stack corresponds to the set force (YES at 708), after which the method ends (712).

Figure 8:
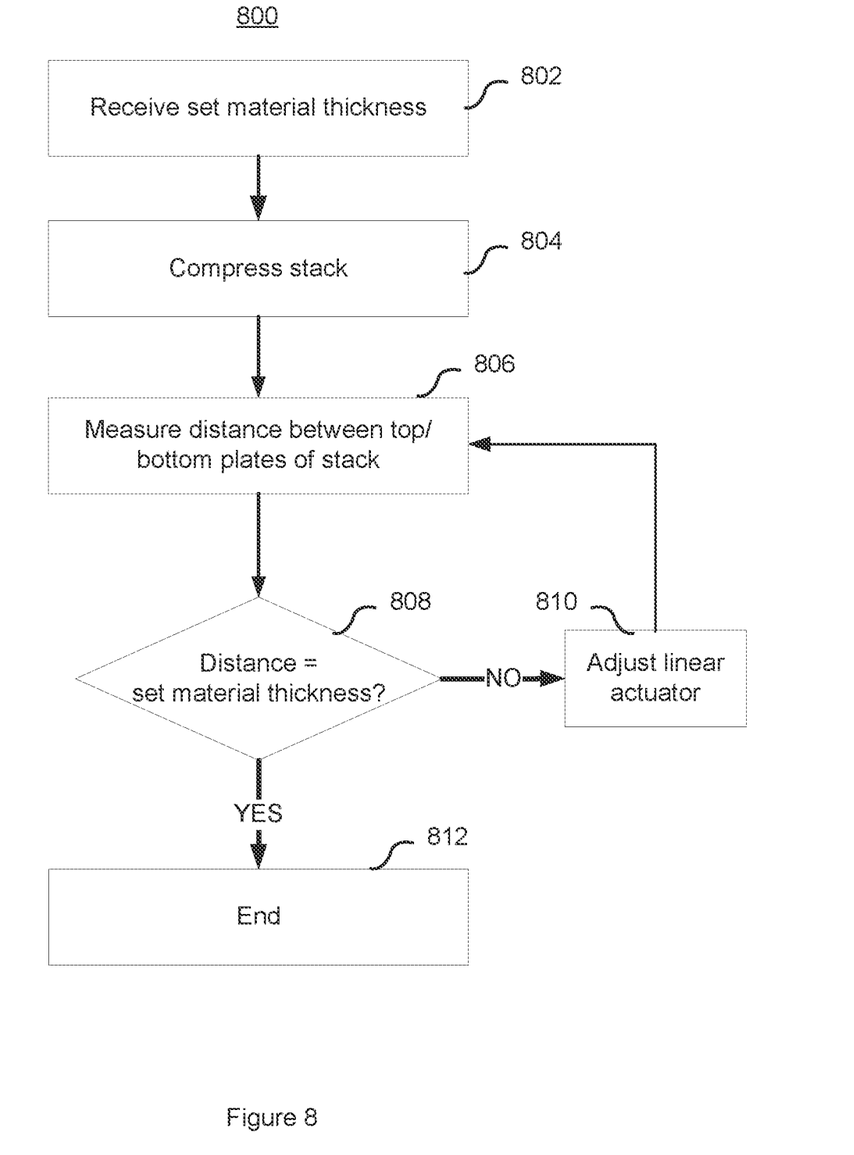
FIG. 8 depicts another embodiment of a method of compressing a stack for measuring thermal conductivity of a material.

FIG. 8 depicts another embodiment of a method 800 of compressing a stack for measuring thermal conductivity of a material. The method is similar to the method 700 described with reference to FIG. 7, however instead of achieving a compression force applied to the stack, the method 800 is directed to achieving a material thickness of the sample material being compressed.

The method 800 may be executed by a processor configured to control the mechanical assemblies of an apparatus as described above. The stack comprises a first plate in contact with a top surface of the material and a second plate in contact with a bottom surface of the material. The method comprises receiving a set material thickness (802). The set material thickness may be received by user input.

The stack is compressed (804) by compressing a spring that transmits a force to compress the stack. The spring may surround a gimbal joint that is coupled to the first plate of the stack at one end and coupled to a linear actuator at an opposite end. The linear actuator is configured to cause compression of the spring, for example, by actuating a lead screw.

A distance between top and bottom plates of the stack is measured (806). The distance may for example be measured using the encoder assembly described with reference to FIG. 4, or using a displacement transducer.

A determination is made as to whether the distance between top and bottom plates of the stack is equal to the set material thickness (808). If the distance between top and bottom plates of the stack is not equal to the set material thickness (NO at 808), the linear actuator is adjusted (810) to adjust the height of the stack toward achieving the set material thickness. The distance between top and bottom plates of the stack is measured again (806), and a further determination is made as to whether the distance between top and bottom plates of the stack is equal to the set material thickness (808). The method continues until the distance between top and bottom plates of the stack corresponds to the set material thickness (YES at 808), after which the method ends (812).

It would also be appreciated that once the distance between top and bottom plates of the stack corresponds to the set material thickness, the method may further comprise controlling a guard adjustment system as described with reference to FIG. 6 based on the positioning of the top and bottom plates.

It will be apparent to persons skilled in the art that a number of variations and modifications can be made without departing from the scope of the invention. Although specific embodiments are described herein, it will be appreciated that modifications may be made to the embodiments without departing from the scope of the current teachings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. An apparatus comprising:
   a stack comprising a first plate in contact with a top surface of a sample material and a second plate in contact with a bottom surface of the sample material;
   a gimbal joint coupled to the first plate at one end and coupled to a linear actuator at an opposite end; and
   a spring surrounding the gimbal joint, wherein the linear actuator is configured to cause compression of the spring, and compression of the spring transmits a force to compress the stack.

2. The apparatus of claim 1, wherein the gimbal joint comprises a flexible rod indirectly coupled to the linear actuator at one end and coupled to a moveable rod at an opposite end, the movable rod configured to move vertically within an opening to facilitate compression of the spring.

3. The apparatus of claim 2, wherein the movable rod comprises a retaining flange at a lower end thereof that is wider than the opening, and the retaining flange retains the movable rod in place when the spring is in an uncompressed state.

4. The apparatus of claim 1, wherein the linear actuator drives a lead screw to create a force that compresses the spring.

5. The apparatus of claim 4, further comprising at least two vertical guide rods extending through a plate, the at least two vertical guide rods extending parallel to the lead screw to maintain alignment of the lead screw.

6. The apparatus of claim 1, further comprising an encoder and encoder strip, the encoder strip held by a linear rail coupled to the stack, the encoder mounted to a ball joint coupled to the linear actuator.

7. The apparatus of claim 6, wherein the linear rail is mounted to a ball joint at its base.

8. The apparatus of claim 6, wherein the encoder reads the encoder strip to determine a height of the stack.

9. The apparatus of claim 1, further comprising a guard positionable to surround the first and second plates.

10. The apparatus of claim 9, wherein the guard is positionable in a vertical direction via a lead screw and stepper motor.

11. The apparatus of claim 10, further comprising at least two guide rods for horizontal alignment of the guard.

12. The apparatus of claim 10, wherein the guard is positioned automatically based on a thickness of the sample material.

13. The apparatus of claim 1, further comprising a load cell configured to measure an upward force received from the stack.

14. The apparatus of claim 13, wherein an output from the load cell is provided to a processor, and the processor controls the linear actuator to apply a set force to the stack.

15. A method of compressing a stack, the stack comprising a first plate in contact with a top surface of a sample material and a second plate in contact with a bottom surface of the sample material, the method comprising:
  receiving a set force of compression to be applied to the stack;
  compressing the stack by compressing a spring surrounding a gimbal joint, the gimbal joint coupled to the first plate at one end and coupled to a linear actuator at an opposite end, the linear actuator configured to cause compression of the spring;
  measuring, with a load cell, an upward force received from the stack; and
  adjusting the linear actuator to adjust compression of the spring until the upward force received from the stack corresponds to the set force.

16. A method of compressing a stack, the stack comprising a first plate in contact with a top surface of a sample material and a second plate in contact with a bottom surface of the sample material, the method comprising:
  receiving a set material thickness;
  compressing the stack by compressing a spring surrounding a gimbal joint, the gimbal joint coupled to the first plate at one end and coupled to a linear actuator at an opposite end, the linear actuator configured to cause compression of the spring;
  measuring a distance between the top and bottom plates of the stack; and
  adjusting the linear actuator to adjust the stack until the distance between the top and bottom plates of the stack corresponds to the set material thickness.

* * * * *